United States Patent [19]

Turner

[11] 4,275,865

[45] Jun. 30, 1981

[54] FLUID CONTROL VALVES

[75] Inventor: Ronald F. Turner, London, England

[73] Assignee: Lucas Industries Limited, Birmingham, England

[21] Appl. No.: 843,453

[22] Filed: Oct. 19, 1977

[30] Foreign Application Priority Data

Aug. 24, 1977 [GB] United Kingdom ............... 35600/77

[51] Int. Cl.[3] ..................... F16K 31/122; F02N 17/00

[52] U.S. Cl. .................................. 251/63; 123/179 L; 137/625.66; 137/DIG. 4

[58] Field of Search ..................... 123/139 ST, 179 L; 417/462, 559, 286; 137/625.66, 529, DIG. 4; 251/63

[56] References Cited

U.S. PATENT DOCUMENTS

| | | | |
|---|---|---|---|
| 2,070,659 | 2/1937 | Higham | 137/529 |
| 3,086,552 | 4/1963 | Ragsdale | 137/DIG. 4 |
| 3,621,875 | 11/1971 | Alexander | 137/529 |
| 3,698,415 | 10/1972 | Foster et al. | 137/529 |
| 3,847,509 | 11/1974 | Bonin | 417/462 |
| 3,882,678 | 5/1975 | Fassbender | 417/286 |
| 4,002,027 | 1/1977 | Eley et al. | 417/286 |
| 4,083,345 | 4/1978 | Davis | 123/179 L |

FOREIGN PATENT DOCUMENTS

| | | | |
|---|---|---|---|
| 2630385 | 5/1977 | Fed. Rep. of Germany . | |
| 473039 | 12/1952 | Italy | 137/529 |

*Primary Examiner*—Martin P. Schwadron
*Assistant Examiner*—A. Michael Chambers

[57] ABSTRACT

A fluid control valve comprises a body in which is defined a bore accommodating a slidable valve member. At one end the valve member is exposed to a fluid pressure which in use, increases to urge the valve member against the action of a spring. The valve member and body have co-operating ports through which a fluid can flow and particles in the fluid tend to cause the valve member to be held against the action of the spring even when the pressure is removed. In order to prevent this the final movement of the valve member causes compression of a resilient member. The force required to compress this member is appreciably higher than the force required to compress the spring and when the fluid pressure is removed the resilient member imparts an initial movement to the valve member whereafter continued movement of the valve member takes place under the action of the spring. The initial force provided by the resilient member is sufficient to counteract any sticking effect.

1 Claim, 3 Drawing Figures

10
11
12
13
14
15
16
17
18
19
20
21
22
23
24
25
26

22
23
24
25
27
28
29
30
31
32
33
34
35
36
37
38
39
40
41
42

FLUID CONTROL VALVES

This invention relates to fluid control valves of the kind comprising a body, a bore defined in the body, a valve member slidable within the bore, resilient means acting on one end of the valve member, an opening into said bore whereby fluid pressure can be applied, in use, to said valve member to move same in the bore against the action of said resilient means, a pair of ports extending within the body and opening into the bore and a groove on the valve member for placing said ports in communication with each other when the valve member has been moved against the action of said resilient means to an operated position, said ports and groove forming a flow path for liquid, said flow path being interrupted when the valve member is moved by the action of said resilient means.

An example of such a valve is seen in FIG. 7 of German Offenlegungsschrift No. P 26 30 385.5. The valve in this case controls the flow of liquid fuel between a central port and one or the other of a pair of side ports disposed on the opposite sides respectively of the central port. The valve forms part of a fuel pumping apparatus for supplying fuel to an internal combustion engine and when the engine is in operation the valve remains in the operated position i.e. with the resilient means compressed, for as long as the engine is in operation. During this time flow of fuel takes place through the groove in the valve member. The fuel supplied to a fuel pumping apparatus is carefully filtered to remove as much solid material as possible, particularly solid material which is of a size such that it could cause damage to the carefully machined surfaces of the apparatus. In spite of careful filtration, some solid material does remain in the fuel and it has been found that it can accumulate in the groove and thereby cause sticking of the valve member in the operated position.

It will of course be appreciated that the strength of the resilient means in this case a coiled compression spring, cannot be increased because it is the strength of the spring in conjunction with the area of the valve member, which determines the operating characteristics of the valve. If the valve member should stick, then clearly the operation of the pumping apparatus is impaired.

The object of the present invention is to provide a valve of the kind specified in a form in which the risk of the valve member sticking as described is minimised.

According to the invention, a valve of the kind specified comprises additional resilient means, said additional resilient means being further stressed by the action of fluid pressure on the valve member after the valve member has been moved against the action of said first-mentioned resilient means to the operated position, said additional resilient means acting when the fluid pressure falls, to impart initial movement to the valve member.

One example of a fluid control valve in accordance with the invention will now be described with reference to the accompanying drawings, in which.

Figures 1, 2:
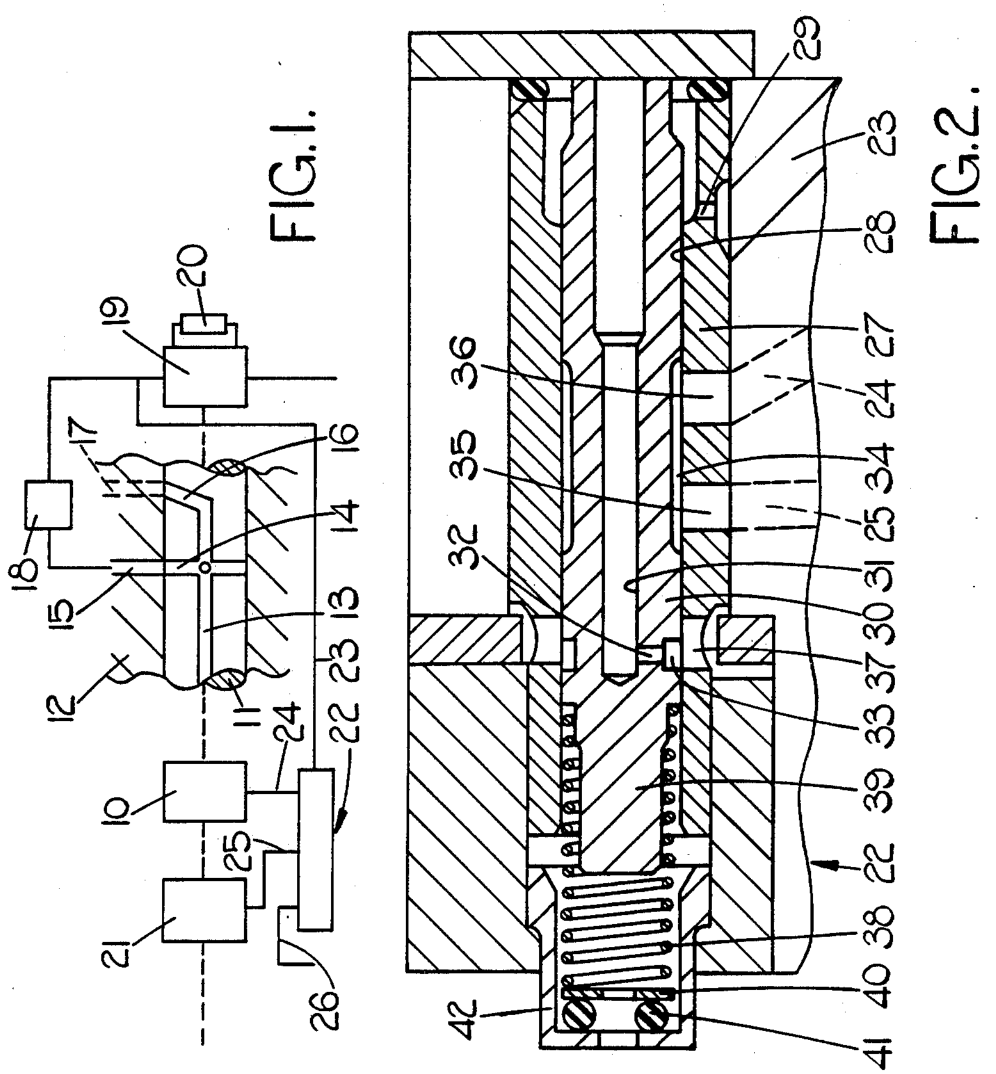
FIG. 1 is a diagrammatic view of a fuel pumping apparatus.
FIGS. 2 and 3 show in sectional side elevation the valve which is shown in outline in FIG. 1 in alternative positions.

A comprehensive description of the fuel pumping apparatus is to be found in the aforementioned German Specification. However, for the sake of completeness, reference will now be made to FIG. 1 which shows at 10, a fuel injection pump which includes a pair of pumping plungers which are mounted in a bore contained in a rotatable body 11. The body 11 or distributor member, is rotatably mounted within a pump housing 12, and formed in the distributor member is a longitudinal bore 13 which is in communication with the bore which accommodates the aforesaid plungers. The passage 13 communicates in the example, with four outwardly extending inlet passages 14 which are arranged to register in turn and as the distributor member is rotated, with an inlet port 15 formed in the pump housing. The passage 13 is also in communication with a delivery passage 16 which can register in turn with outlet ports 17 only one of which is shown. The outlet ports are formed in the pump housing and in use, communicate with the injection nozzles of an engine to which fuel is supplied by the apparatus. The communication of the delivery passage 16 with an outlet port 17 takes place when the inlet port 15 is out of communication with the outlet passages 14.

Fuel is supplied to the inlet port 15 by way of an adjustable throttle 18 which is interposed between the port 15 and the outlet of a feed pump 19 the rotary part of which is mounted on the distributor member 11. The outlet pressure of the feed pump 19 is controlled by means of a valve 20 so that the pressure varies in accordance with the speed at which the apparatus is driven.

In operation, during filling of the injection pump 10 fuel flows from the feed pump 19 by way of the throttle 18 to the inlet port 15 and from the inlet port by way of one of the inlet passages 14 to the injection pump. The amount of fuel supplied to the injection pump is controlled by the throttle 18. As the distributor member 11 rotates, the aforesaid passage 14 is moved out of register with the inlet port 15 and the delivery passsage is moved into register with an outlet port 17 and the quantity of fuel previously supplied to the injection pump is delivered through the outlet port to the associated engine. The cycle as described is then repeated.

The maximum amount of fuel which can be supplied by the apparatus is normally determined by means of mechanical stops associated with the aforesaid plungers, which form part of the injection pump 10. These stops are adjusted when the apparatus is assembled. However, for starting purposes it is often necessary to be able to supply to the engine more fuel than is allowed by the aforesaid stops.

The supply of the extra volume of fuel is ensured by an additional injection pump referenced 21. The construction of this additional pump is substantially identical to the construction of the pump 10 and a fluid control valve generally indicated at 22, is provided to control the fuel flow of the additional injection pump 21. For this purpose the valve 22 is responsive to the outlet pressure of the feed pump 19 and a passage 23 is provided from the outlet of the feed pump 19 to the valve body. The valve body has three additional fluid connections. The first of these is a connection 24 with the aforesaid bore of the injection pump 10, the second is a connection 25 with the additional injection pump 21 and the third is a connection indicated at 26 with a drain. Conveniently, the rotary part of the injection pump 21 is formed in the distributor member and the valve 22 is also mounted in the distributor member. The drain 26 in effect, is the interior of the pumping apparatus and in most cases this is connected by way of a pressurising valve, either to the inlet of the feed pump 19 or to the main fuel tank.

FIG. 2 shows in greater detail the construction of the valve 22 and it will be seen to comprise a valve body in the form of a sleeve 27 within which is formed a bore 28. The bore 28 is enlarged at one end and this end of the bore is closed by a part of the distributor member. Communicating with the enlarged end of the bore 28 is a restricted opening 29 which communicates with the conduit 23.

Slidable within the bore 28 is a valve member 30. In FIG. 2 the valve member is shown in its extreme positions, the lower position being the position which it adopts when the outlet pressure of the feed pump 19 has exceeded a predetermined value. At its end within the aforesaid chamber, the outer periphery of the valve member is stepped and extending from this end of the valve member is a blind bore 31. The bore 31 communicates with a transverse drilling 32 which in turn communicates with a circumferential groove formed on the periphery of the valve member. A further circumferential groove 34 is formed on the periphery of the valve member and this groove has substantial length and constitutes part of the flow path which is controlled by the valve.

For registration with the groove 34 there are provided three ports in the aforesaid sleeve. The ports are axially spaced and the central one of the ports which is referenced 35, is in communication with the fluid connection 25 which leads to the bore accommodating the plungers of the additional injection pump 21.

The right-hand one of the ports which is referenced 36, communicates with the fluid connection 24 and the left-hand one of the ports which is referenced 37, communicates with the interior of the apparatus.

The valve member is biased towards its inoperative position in which it is shown in the upper portion of the drawing, by means of a coiled compression spring 38, part of which is located within the bore 28 about a reduced portion of the valve member which defines a projection 39. The other end of the coiled compression spring 38 bears against an apertured plate 40 and this in turn bears against an additional resilient means in the form of an "O" ring 41, formed from resilient material. Finally, the ring 41 engages against the base wall of a cup-shaped member 42 which is retained in the end of a bore formed in the distributor member, and which locates the sleeve 27.

In the inoperative position of the valve, the groove 33 is in register with the port 37 and the two ports 35 and 36, communicate with each other by way of the groove 34. As a result the connections 24 and 25 communicate with each other so that the additional injection pump 21 and the injection pump 10 are connected together. When the engine is at rest the output pressure of the feed pump is zero, but as the engine is cranked for starting purposes, fuel is supplied by way of the throttle to both injection pumps will deliver fuel to the engine so that its receives a volume of fuel in excess of the normal maximum volume of fuel as determined by the stops in the injection pump 10.

Figure 3:
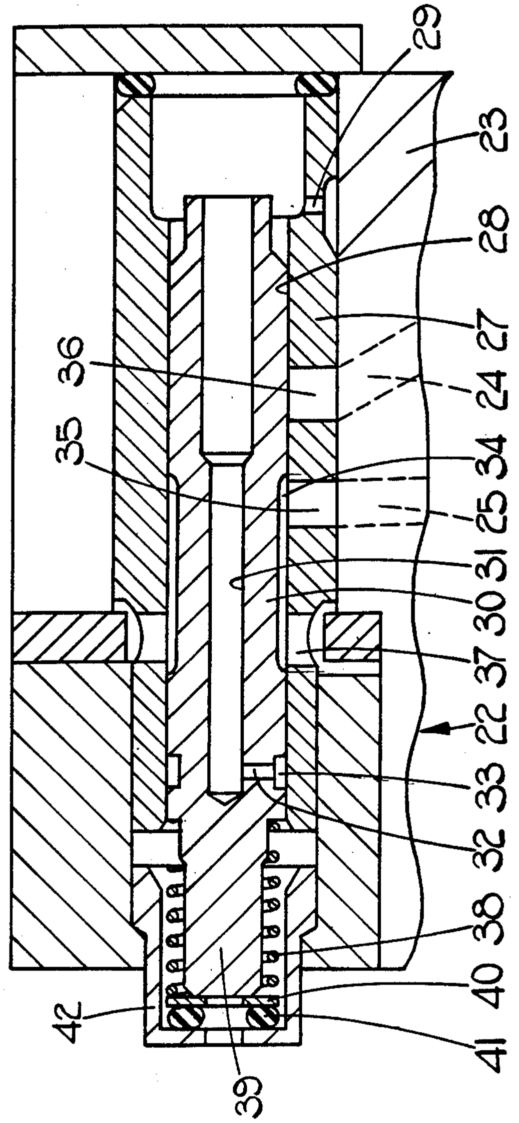

It should be noted that in the inoperative position of the valve, only the annular area defined by the reduced portion of the valve member within the aforesaid chamber, is exposed to the outlet pressure of the feed pump. The reason for this is that the valve member bears against the aforesaid end closure and the bore 31 communicates with the interior of the apparatus. As the associated engine starts therefore, an appreciable rise in the output pressure of the feed pump must occur before the valve member is moved against the action of the spring 38. As soon as the valve member moves to its operated position, the groove 33 is moved out of register with the port 37 and effectively the whole end area of the valve member is exposed to the outlet pressure of the feed pump. As a result, the valve member moves rapidly towards the left. The pressure at which this occurs is of course dependent upon the force exerted by the spring 38 and the aforesaid annular area defined by the valve member. During movement of the valve member towards the left to its operated position, the groove 34 moves out of communication with the port 36 and into communication with the port 37. Communication of the connection 25 with the connection 24 is therefore broken and instead the connection 25 is brought into communication with the drain 26. The injection pump 21 therefore receives no more fuel from the feed pump, neither does it deliver any more fuel to the passage 13. It can, however, continue to partake of its natural pumping action with fuel flowing backwards and forwards through the flow path defined by the ports 35 and 37 and the groove 34. When the extension 39 engages the plate 40, the spring 38 is fully compressed. However, because the "O" ring is resilient, there will be additional movement of the valve member which results in deformation of the ring, this being indicated in FIG. 3 of the drawing. The force resisting movement of the valve member exerted by the ring 41 will be substantially higher than the force which can be created by the spring 38. In use, accumulation of dirt will occur in the aforesaid flow passage and this accumulation as explained, could lead to sticking of the valve member in its operated position when the engine is stopped. If this did occur then it would be impossible for the apparatus to supply the additional fuel required to facilitate starting.

The force exerted by the ring 41, however, is sufficient when the outlet pressure of the feed pump 19 falls, to impart initial movement to the valve member to unstick the valve member. The continued movement of the valve member takes place under the action of the spring 38, the force exerted by which is sufficient to effect such movement once initial movement of the valve member has taken place.

I claim:

1. A fluid control valve comprising a body, a bore in the body, a valve member slidable in the bore, a coiled compression spring acting upon one end of the valve member, an opening into said bore whereby in use, fluid pressure can be applied to the valve member to move same in the bore against the action of the coiled spring from an inoperative position to an operative position when a predetermined fluid pressure is attained, a resilient member formed from elastomeric material located in an end of the bore, an abutment member located against said resilient member, the other end of said coiled compression spring engaging with said abutment member, said valve member including a portion extending concentrically into said compression spring and engaging said abutment member when said valve member attains said operative position, the engagement of said portion with said abutment member acting to limit the compression of said coiled compression spring, said resilient member being stressed to allow said valve member to move an additional amount when the fluid pressure increases further, said resilient member acting when the fluid pressure falls, to impart initial movement of the valve member towards the inoperative position.

* * * * *